(12) United States Patent
Le (10) Patent No.: US 11,695,897 B2
(45) Date of Patent: Jul. 4, 2023

(54) CORRECTING ENGAGEMENT OF A USER IN A VIDEO CONFERENCE

(71) Applicant: ADVANCED MICRO DEVICES, INC., Santa Clara, CA (US)

(72) Inventor: Roto Le, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/485,784

(22) Filed: Sep. 27, 2021

(65) Prior Publication Data

US 2023/0100421 A1     Mar. 30, 2023

(51) Int. Cl.
*H04N 7/15* (2006.01)
*H04N 5/272* (2006.01)
*G06T 7/70* (2017.01)
*H04L 65/403* (2022.01)
*H04N 7/14* (2006.01)

(52) U.S. Cl.
CPC ............ *H04N 5/272* (2013.01); *G06T 7/70* (2017.01); *H04L 65/403* (2013.01); *H04N 7/144* (2013.01); *H04N 7/15* (2013.01); *G06T 2207/10016* (2013.01); *G06T 2207/30201* (2013.01)

(58) Field of Classification Search
CPC .......... H04N 5/272; H04N 7/15; H04N 7/147; G06T 7/70; H04L 65/403
USPC ............................................ 348/14.01–14.16
See application file for complete search history.

(56) References Cited

U.S. PATENT DOCUMENTS

| | | |
|---|---|---|
| 8,908,008 B2 | 12/2014 | Tan et al. |
| 8,947,493 B2 | 2/2015 | Lian et al. |
| 9,288,388 B2 | 3/2016 | Son et al. |
| 9,438,819 B2 | 9/2016 | Broeck |
| 2012/0257035 A1 | 10/2012 | Larsen |
| 2016/0073054 A1* | 3/2016 | Balasaygun ........ H04L 12/1813 348/14.08 |
| 2019/0019067 A1* | 1/2019 | Dettori .................. H04N 7/147 |
| 2019/0392204 A1* | 12/2019 | Anders ............... G06K 9/6218 |
| 2021/0021439 A1* | 1/2021 | Gorny ................ H04L 12/1822 |
| 2022/0012913 A1* | 1/2022 | Thomas ............... G06V 40/169 |
| 2022/0070504 A1* | 3/2022 | Hartnett ............. H04L 12/1827 |

* cited by examiner

*Primary Examiner* — Melur Ramakrishnaiah (57) ABSTRACT

Correcting engagement of a user in a video conference includes: receiving video data of a user of a participant device of a video conference; determining that one or more visual characteristics of the video data satisfy one or more criteria; and displaying, by the participant device, a visual overlay in response to the one or more criteria being satisfied.

20 Claims, 6 Drawing Sheets

CORRECTING ENGAGEMENT OF A USER IN A VIDEO CONFERENCE

BACKGROUND

During a video conference, the participants (e.g., users of devices) are often visible to other participants. For example, each user device includes a camera to capture the face of the user. Video of the user is then provided to the other participants, allowing each user to see the other users during the video conference.

DETAILED DESCRIPTION

Various user behaviors are indicative of disinterest or disengagement of the user with a video conference. Such behaviors include, for example, a user line of sight being directed away from a display rendering the video conference, a user facing away from a display rendering the video conference, slouching, leaning, other postures or other behaviors as can be appreciated.

To that end, the present specification sets forth various implementations of correcting engagement of a user in a video conference. In some implementations, a method of correcting engagement includes determining that the user is disengaged with a video conference based on one or more visual characteristics of the user in video data of the user and displaying a visual overlay to remedy disengagement with the video conference.

In some implementations, the one or more visual characteristics used to determine that the user is disengaged include one or more of: a posture of the user, a gaze of the user, or a facial direction of the user. In some implementations, determining that the user is disengaged with the video conference includes providing video data of the user to a classifier model.

In some implementations, correcting engagement of a user in a video conference also includes determining that the disengagement with the video conference has been remedied and ending display of the visual overlay.

In some implementations, determining that the user is disengaged with the video conference or displaying the visual overlay is based on one or more user preferences. In some implementations, the one or more user preferences are associated with the user. In some implementations, the one or more user preferences are associated with a host of the video conference.

The present specification also describes various implementations of apparatus for correcting engagement of a user in a video conference. Such an apparatus includes a computer processor and a computer memory, where the computer memory includes computer program instructions that, when executed by the computer processor, cause the computer processor to carry out: determining that a user is disengaged with a video conference based on one or more visual characteristics of the user in video data of the user and displaying a visual overlay to remedy disengagement with the video conference.

In some implementations, the one or more visual characteristics include one or more of: a posture of the user, a gaze of the user, or a facial direction of the user. In some implementations, determining that the user is disengaged with the video conference includes providing video data of the user to a classifier model. In some implementations, the apparatus also includes computer program instructions that, when executed by the computer processor, cause the computer processor to carry out: determining that the disengagement with the video conference has been remedied; and ending display of the visual overlay. In some implementations, determining that the user is disengaged with the video conference or displaying the visual overlay is based on one or more user preferences. In some implementations, the one or more user preferences are associated with the user. In some implementations, the one or more user preferences are associated with a host of the video conference.

Also described in this specification are various implementations of a computer program product for correcting engagement of a user in a video conference. Such a computer program product is disposed upon a non-transitory computer readable medium stores computer program instructions that, when executed, cause a computer system to perform: determining that a user is disengaged with a video conference based on one or more visual characteristics of the user in video data of the user and displaying a visual overlay to remedy disengagement with the video conference.

In some implementations, the one or more visual characteristics include one or more of: a posture of the user, a gaze of the user, or a facial direction of the user. In some implementations, determining that the user is disengaged with the video conference includes providing video data of the user to a classifier model. In some implementations, the computer program product also includes computer program instructions that, when executed, cause a computer system to determine that the disengagement with the video conference has been remedied and end display of the visual overlay. In some implementations, determining that the user is disengaged with the video conference or displaying the visual overlay is based on one or more user preferences. In some implementations, the one or more user preferences are associated with the user.

Figure 1:
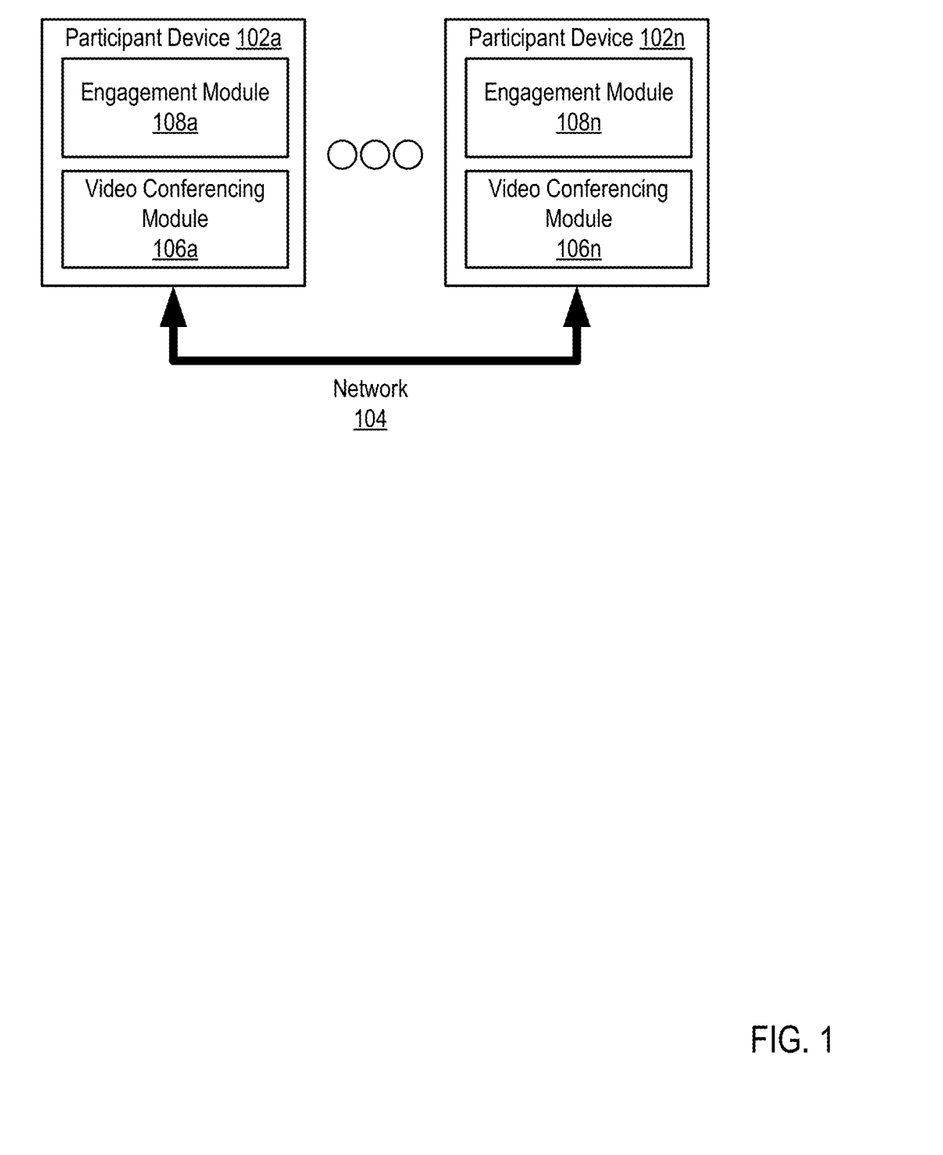
FIG. 1 is a block diagram of an example system for correcting engagement of a user in a video conference according to some implementations.

Various implementations of correcting engagement of a user in a video conference are described in greater detail below with respect to various figures. FIG. 1 is a block diagram of a non-limiting example system. The example system includes multiple participant devices 102a-n. Each participant device 102a-n can be implemented as one of variety of computing devices, including mobile devices, personal computers, peripheral hardware components, gaming devices, set-top boxes, and the like. The participant devices 102a-n are communicatively coupled via a network 104. The network 104 includes one or more wired networks, one or more wireless networks, combinations thereof, or other networks as can be appreciated that facilitate data communications between participant devices 102a-n.

Each participant device 102a-n includes a respective video conferencing module 106a-n. The video conferencing module 106a-n is a module facilitating a video conference between the users of participant devices 102a-n. The video conferencing module 106a-n encodes video data of a user, audio data of a user, or combinations thereof (e.g., using cameras, microphones, or other input devices of the participant device) and provides the encoded video data to other participant devices 102a-n for rendering and display. In some implementations, the video conferencing module 106a-n is configured to encode, as part of a participant's video data, a user interface or display of the participant device and provide the video data to the other participant devices 102a-n for rendering and display (e.g., "screen sharing").

In some implementations, the video conferencing module 106a-n displays video and audio data of a currently speaking user in a larger window relative to other users. In other words, the video and audio data from a participant device 102a-n whose user is actively speaking (e.g., as determined by detecting incoming audio data) is displayed in a larger window, while the video of other users is displayed in respective smaller windows. Thus, while each user is visible, the video of a currently speaking user is presented in a larger window relative to other windows. In other implementations, the video of a predefined user is presented in a larger window regardless of whether the predefined user is actively speaking. For example, the video a designated presenter, host, or other higher priority user is presented in a larger window while the video of other users is presented in other windows.

Each participant device 102a-n also includes an engagement module 108a-n, a module for correcting engagement of a user in a video conference according to implementations of the present disclosure. The engagement module may be implemented as software, computer hardware, or some combination of both. The engagement module 108a-n of a given participant device 102a-n determines, based on one or more visual characteristics of a user in video data of the user, whether the user is disengaged with a video conference. In some implementations, the one or more visual characteristics of the user include a gaze (e.g., a line of sight) of the user. In some implementations, eye tracking algorithms are used to determine a focus of the gaze of the user. For example, one or more images of a user (e.g., as embodied in video data of the user) are provided as input to one or more models (e.g., machine learning models, algorithmic models, and the like) that provide, as output, a gaze or line of sight of the user. In some implementations, the gaze or line of sight of the user is expressed as a point or area of a display in the line of sight of the user. In other implementations, the gaze of line of sight of the user is expressed as an angle of sight relative to a user's eyes. A particular portion of a display or user interface viewed by the user is then calculated based on the angle of sight and a position of the user relative to the display (e.g., distance from the display, height of the user relative to the display, and the like).

In some implementations, the gaze of the user indicates disengagement when the gaze of the user is not directed to a window or user interface displaying the video conference. As an example, the gaze of the user indicates disengagement when the gaze of the user is directed to another window (e.g., another application executed on the participant device 102a-n). As an example, the gaze of the user indicates disengagement when the gaze of the user is directed away from a display presenting the video conference. As a further example, the gaze of the user indicates disengagement when the gaze of the user is directed to video of a user other than a currently active speaker or another user whose video data is not presented in a primary or largest window of the video conference.

Consider an example where a participant in the video conference is focused on the video of another user rather than a currently active speaker. The participant's line of sight will then be directed to the window displaying the video of the other user, not the primary or larger window displaying the video of the currently active speaker. This line of sight contributes to a determination that the user is disengaged with the video conference.

In some implementations, the one or more visual characteristics of the user include a facial direction of the user (e.g., a direction that the face of a user is pointed or directed). In some implementations, the facial direction of the user is expressed as one or more angles of the face of the user relative to a display. For example, one or more images of a user (e.g., as embodied in video data of the user) are provided as input to one or more models (e.g., machine learning models, algorithmic models, and the like) that provide, as output, a facial direction of the user. In some implementations, a facial direction of the user will indicate disengagement when one or more angles of the facial direction exceed a threshold. For example, a user facing directly at the display will have a facial direction substantially perpendicular to the display, while a user facing away from the display will have a greater angle of facial direction. One skilled in the art will appreciate that a facial direction of the user is separate from the line of sight of the user, as the line of sight of the user does not necessarily match the facial direction of the user. One skilled in the art will appreciate that, in some implementations, the facial direction of the user is used instead of or in conjunction with the line of sight of the user as possible visual characteristics indicating disengagement with video conference.

Consider an example where a participant in the video conference frequently looks at their phone, causing them to face away from the display presenting the video conference, and instead turning to face their phone. This facial direction contributes to a determination that the user is disengaged with the video conference.

In some implementations, the one or more visual characteristics of the user include a posture of the user. The posture of the user includes a position of the user within the video data capturing the user. In some implementations, the posture of the user includes a vertical positioning of the user in the video data (e.g., a height of the user in the frame of video data). For example, in some implementations, a vertical position of the user falling below a threshold indicates disengagement with the video conference. As another example, in some implementations, a change in or delta of a vertical position of the user exceeding a threshold indicates disengagement with the video conference. In other words, an initial vertical position of a user is compared to a current vertical position of the user, and the difference in vertical position indicates disengagement with the video content where the difference exceeds a threshold.

In some implementations, the posture of the user includes an angle of posture of the user in the video data (e.g., relative to the Y-axis). For example, a user sitting upright will have a lesser angle of posture, while a user leaning to one side will have a greater angle of posture. For example, in some implementations, an angle of posture of the user exceeding a threshold indicates disengagement with the video conference. As another example, in some implementations, change or delta of an angle of posture of the user exceeding a threshold indicates disengagement with the video conference.

In some implementations, determining whether the user is disengaged with the video conference includes calculating an engagement score based on the one or more characteristics of the user. For example, a line of sight, facial angle, posture, and potentially other characteristics are quantified and input to a function that calculates an engagement score for the user. The user is determined to be disengaged when the engagement score falls below a threshold.

In other implementations, determining whether the user is disengaged with the video conference includes providing video data of the user to a classifier model. The classifier model is trained to determine, based on input image or video data, whether a user depicted in the input data is disengaged. For example, training data depicting engaged and disengaged users are used to train the classifier model. The video data of the user is then provided as input to the classifier model, and an output is generated indicating whether or not the user is disengaged.

In some implementations, the classifier model is one of a plurality of classifier models each trained to determine whether a user is disengaged with the video conference based on different visual characteristics. For example, a first classifier model is trained to determine whether a user is disengaged with the video conference based on the gaze of the user, a second classifier model is trained to determine whether a user is disengaged with the video conference based on a facial direction of the user, a third classifier model is trained to determine whether a user is disengaged with the video conference based on both line of site and posture, and the like. Accordingly, in some implementations, the engagement module 108a-n is configurable to determine whether a user is engaged based on a configurable set of visual characteristics.

In response to a determination that the user is disengaged with the video conference, the engagement module 108a-n displays a visual overlay to remedy disengagement with the video conference. In some implementations, the visual overlay is displayed at a predefined location relative to the video conference, or at a predefined location in the display. For example, the visual overlay is displayed in an upper portion of the display so as to be visible to the user without obstructing view of the video conference. In some implementations, the visual overlay includes a user interface element (e.g., transparent or opaque). In some implementations, the visual overlay includes a notification or other message presented to the user. In some implementations, a sound or other audio notification is played concurrent to displaying the visual overlay. In some implementations, the visual overlay is displayed in response to determining that the user is disengaged with the video conference for a predefined amount of time, thereby preventing display of the visual overlay during momentary or brief lapses in engagement.

By presenting the visual overlay, a user is notified that they appear disengaged with the video conference. This allows the user to take corrective action to appear more engaged with the content (e.g., adjusting posture, redirecting their line of sight to the video conference, and the like).

In some implementations, the engagement module 108a-n determines that disengagement with the video conference has been remedied. In some implementations, after displaying the visual overlay, the engagement module 108a-n continually or periodically redetermines whether the user is disengaged with the video conference. For example, the engagement module 108a-n recalculates engagement scores or provides video data of the user to a classifier model to determine whether disengagement with the video conference has been remedied. In response to the disengagement with the video conference being remedied (e.g., by virtue of an engagement score meeting a threshold or by the classifier determining that the user is engaged), the engagement module 108a-n then ends display of the visual overlay.

In some implementations, determining that the user is disengaged with the video conference or displaying the visual overlay is based on one or more user preferences. In some implementations, the one or more user preferences are defined by the user (e.g., the user whose engagement is being determined). In other implementations, the one or more user preferences are defined by another user, such as a host or administrator associated with the video conference.

In some implementations, the user preferences determine whether or not the visual overlay is displayed at all. For example, a user does not wish to be notified when they appear disengaged, and preferentially select that the visual overlay not be displayed. As another example, a user selects that they wish to be notified when they appear disengaged. As a further example, a host of a video conference selects that all users participating in the video conference will have a visual overlay displayed if determined that they are disengaged with the video conference.

In some implementations, the user preferences define a duration that the visual overlay is displayed (e.g., for a predefined amount of time, until it is determined that the disengagement has been remedied. In some implementations, the user preferences define a time window or time threshold after ending display of a visual overlay until another visual overlay is able to be displayed. In some implementations, the user preferences define particular visual characteristics to be used in determining whether a user is disengaged with the video conference. Accordingly, in some implementations, particular classifier models or engagement score functions to be used are based on the user preferences.

One skilled in the art will appreciate that the example system of FIG. 1 is merely exemplary, and that other configurations or arrangements of devices are also contemplated within the scope of the present disclosure. For example, in some implementations, an engagement module 108a-n for a given participant device 102a-n will determine whether a user of another participant device 102a-n is disengaged with a video conference. For example, assume that the participant device 102a-n of a host or other user of the video conference receives, from other participant devices 102a-n, video data of their respective users. The engagement module 108a-n of the given participant device 102a-n then determines, based on the received video data, whether each of the other users are disengaged with the video content. In response to a determination that a particular user is disengaged with the video conference, the engagement module 108a-n of the given participant device 102a-n sends a command or notification to the participant device 102a-n of the particular user that causes the visual overlay to be displayed for the particular user.

In another implementation, a server or other computing device (not shown) facilitates the video conference. For example, each participant device 102a-n connects to the server, and the server functions as an intermediary for video and audio data communicated between the participant devices 102a-n. In such an implementation, the participant devices 102*a-n* do not necessarily implement engagement modules 108*a-n*. The server implements an engagement module 108*a-n* an determines, based on the received video data of the users of participant devices 102*a-n*, whether each of the users is disengaged with the video content. In some implementations, in response to a determination that a particular user is disengaged with the video conference, the engagement module 108*a-n* of the server sends a command or notification to the participant device 102*a-n* of the particular user that causes the visual overlay to be displayed for the particular user. In other implementations, in response to a determination that a particular user is disengaged with the video conference, the engagement module 108*a-n* of the server encodes the visual overlay on video data provided to the participant device 102*a-n* of the particular user. For example, the engagement module 108*a-n* of the server encodes the visual overlay on video data of a currently active speaker or other user and provides the modified video data to the participant device 102*a-n* of the particular user.

Figure 2A:
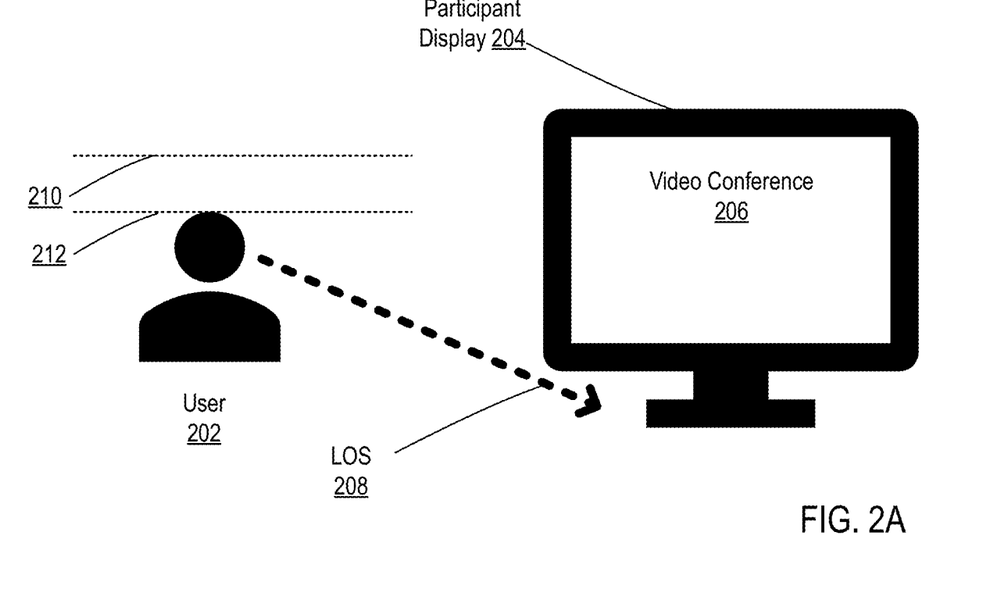
FIG. 2A is a pictorial diagram of an example use case for correcting engagement of a user in a video conference according to some implementations.
Figure 2B:
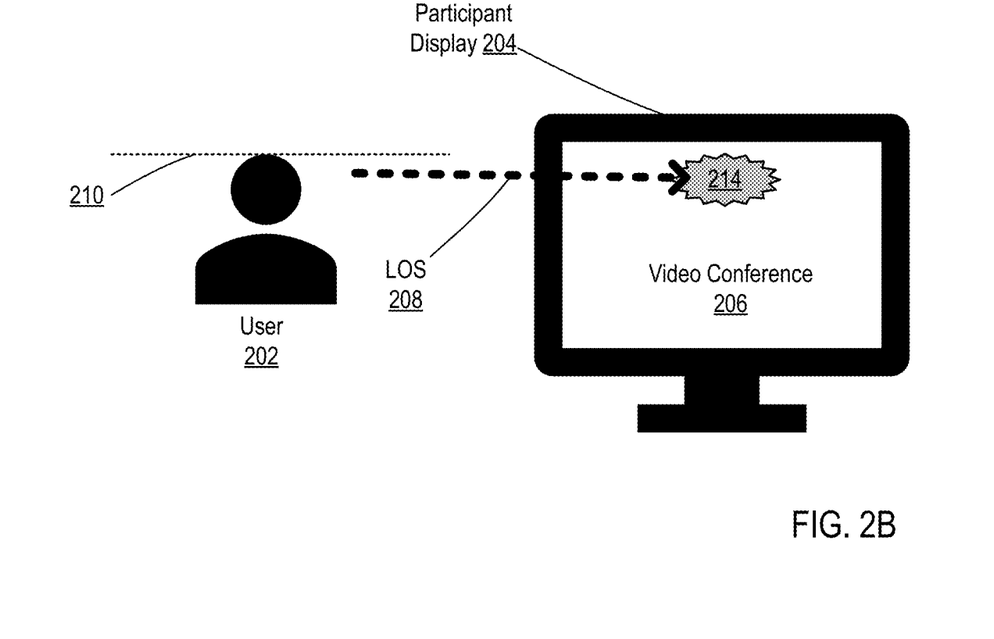
FIG. 2B is a pictorial diagram of an example use case for correcting engagement of a user in a video conference according to some implementations.

FIGS. 2A and 2B show an example pictorials diagram for correcting engagement of a user in a video conference according to implementations of the present disclosure. In the example pictorial diagram of FIG. 2, a user 202 is viewing a participant display 204 presenting a video conference 206 in which the user 202 is participating. In this example, the line of sight (LOS) 208 of the user is directed away from the participant display 204 presenting the video conference 206. Moreover, posture of the user 202 has changed such that the height of the user drops from height 210 to height 212. An engagement module 108*a-n* of the participant device 102*a-n* of the user 202 determines that the user 202 is disengaged with the video conference 206 based on video data of the user 202 (e.g., video data generated by a camera built in to the participant display 204). The video data of the user will capture the change in height as well as the LOS 208 of the user.

Turning to FIG. 2B, in response to the engagement module 108*a-n* of the participant device 102*a-n* of the user 202 determining that the user 202 is disengaged with the video conference 206, the engagement module 108*a-n* causes a visual overlay 214 to be displayed on the video conference 206. The user 202 redirect their LOS 208 to the visual overlay 214, thereby redirecting their LOS 208 to the video conference 206. Moreover, the user 202 has adjusted their posture so that their height rests at height 210, thereby remedying the disengagement with the video conference 206.

Correcting engagement of a user in a video conference in accordance with the present application is generally implemented with computers, that is, with automated computing machinery. For further explanation, therefore, FIG. 3 sets forth a block diagram of computing machinery including an exemplary computer 300 configured for correcting engagement of a user in a video conference according to certain implementations. For example, the participant devices 102*a-n* of FIG. 1 are implemented as a computer 300 of FIG. 3. The computer 300 of FIG. 3 includes at least one computer processor 302 or 'CPU' as well as random access memory (RAM) 304 which is connected through a high speed memory bus 306 and bus adapter 308 to processor 302 and to other components of the computer 300.

Figure 3:
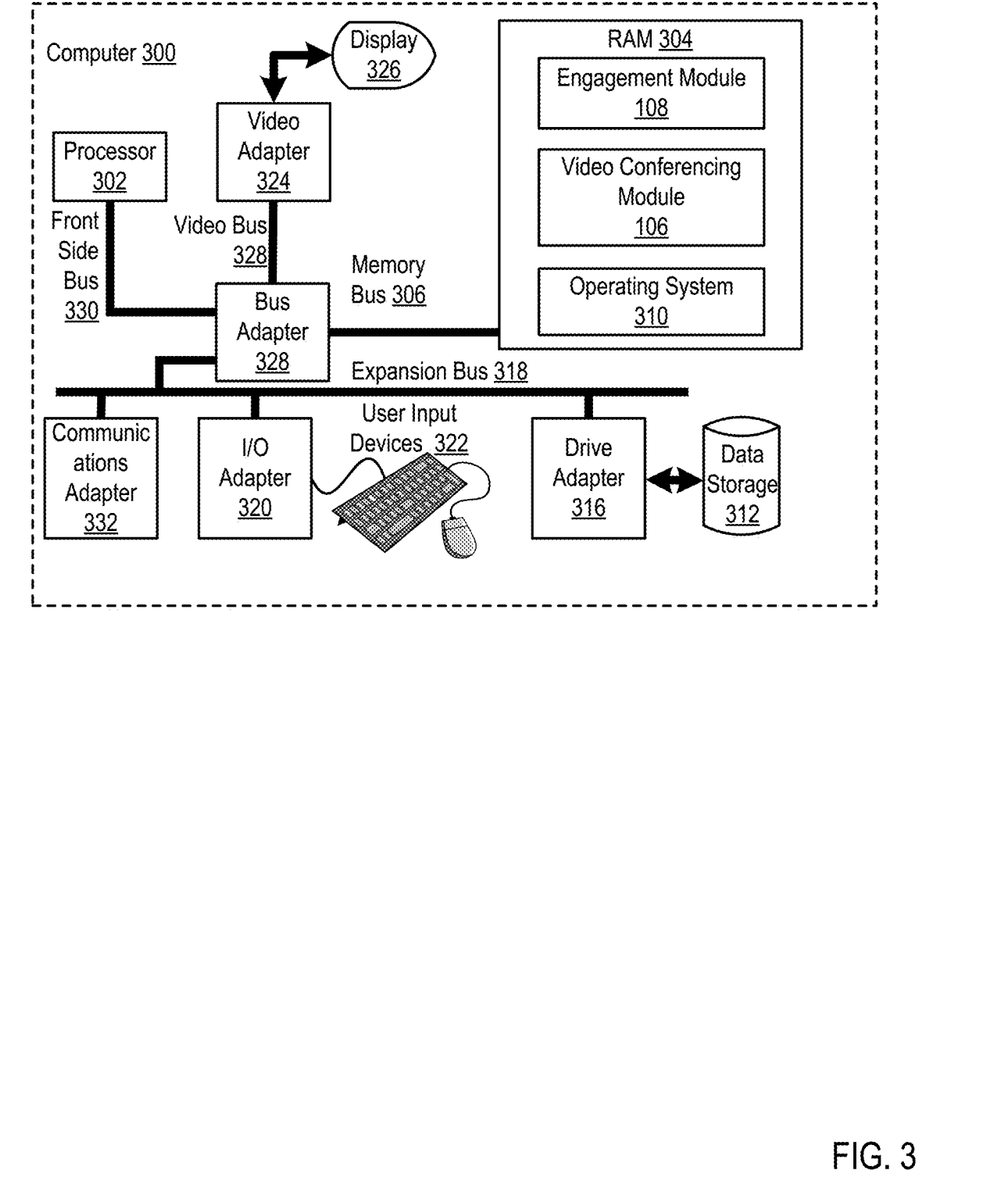
FIG. 3 is a diagram of an example computing device for correcting engagement of a user in a video conference according to some implementations.

Stored in RAM 304 is an operating system 310. Operating systems useful in computers configured for correcting engagement of a user in a video conference according to certain implementations include UNIX™, Linux™, Microsoft Windows™, and others as will occur to those of skill in the art. The operating system 310 in the example of FIG. 3 is shown in RAM 304, but many components of such software typically are stored in non-volatile memory also, such as, for example, on data storage 312, such as a disk drive. Also stored in RAM 304 are an engagement module 108 and video conferencing module 106 according to certain implementations.

The computer 300 of FIG. 3 includes disk drive adapter 316 coupled through expansion bus 318 and bus adapter 308 to processor 302 and other components of the computer 300. Disk drive adapter 316 connects non-volatile data storage to the computer 300 in the form of data storage 312. Disk drive adapters useful in computers configured for correcting engagement of a user in a video conference according to certain implementations include Integrated Drive Electronics ('IDE') adapters, Small Computer System Interface ('SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The example computer 300 of FIG. 3 includes a video adapter 324, which is an example of an I/O adapter specially designed for graphic output to a display device 326 such as a display screen or computer monitor. Video adapter 324 is connected to processor 302 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for correcting engagement of a user in a video conference according to certain implementations include modems for wired dial-up communications, Ethernet (IEEE 802.3) adapters for wired data communications, and 802.11 adapters for wireless data communications.

Figure 4:
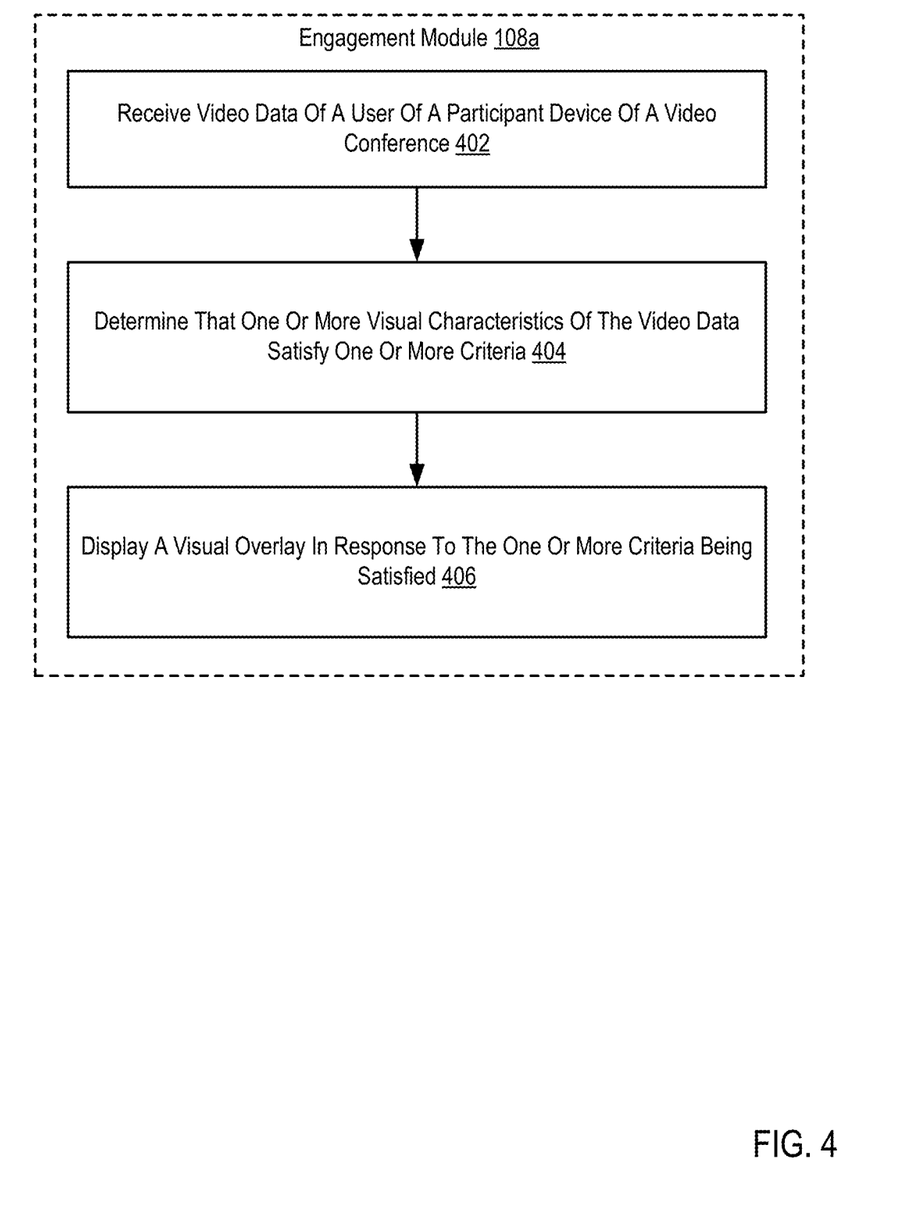
FIG. 4 is a flowchart of an example method for correcting engagement of a user in a video conference according to some implementations.

For further explanation, FIG. 4 sets forth a flow chart illustrating an example method for correcting engagement of a user in a video conference according to implementations of the present disclosure. The method of FIG. 4 will be described with components referenced from the previous figures.

The method of FIG. 4 includes receiving 402 (e.g., by an engagement module 108*a* of a participant device 102*a*) video data of a user of a participant device 102*a* of a video conference. For example, the participant device 102*a* is one of a plurality of participant devices 102*a-n* of a video conference. In some implementations, receiving 402 the video data includes capturing or generating the video data using a camera built into the participant device 102*a* or a peripheral camera device.

The method of FIG. 4 also includes determining 404 that one or more visual characteristics of the video data satisfy one or more criteria. In some implementations, the criteria include predefined criteria indicating that the user is disengaged with the video conference. In other implementations, the criteria include an output of a classifier model (e.g., a model trained to identify users disengaged with the video conference). In some implementations, the one or more visual characteristics of the user include a gaze (e.g., a line of sight) of the user. In some implementations, eye tracking algorithms are used to determine a focus of the gaze of the user. For example, one or more images of a user (e.g., as embodied in video data of the user) are provided as input to one or more models (e.g., machine learning models, algorithmic models, and the like) that provide, as output, a gaze or line of sight of the user. In some implementations, the gaze or line of sight of the user is expressed as a point or area of a display in the line of sight of the user. In other implementations, the gaze of line of sight of the user is expressed as an angle of sight relative to a user's eyes. A particular portion of a display or user interface viewed by the user is then calculated based on the angle of sight and a position of the user relative to the display (e.g., distance from the display, height of the user relative to the display, and the like).

In some implementations, the gaze of the user indicates disengagement when the gaze of the user is not directed to a window or user interface displaying the video conference. As an example, the gaze of the user indicates disengagement when the gaze of the user is directed to another window (e.g., another application executed on the participant device 102a-n). As an example, the gaze of the user indicates disengagement when the gaze of the user is directed away from a display presenting the video conference. As a further example, the gaze of the user indicates disengagement when the gaze of the user is directed to video of a user other than a currently active speaker or another user whose video data is not presented in a primary or largest window of the video conference.

Consider an example where a participant in the video conference is focused on the video of another user rather than a currently active speaker. The participant's line of sight will then be directed to the window displaying the video of the other user, not the primary or larger window displaying the video of the currently active speaker. This line of sight contributes to a determination that the user is disengaged with the video conference.

In some implementations, the one or more visual characteristics of the user include a facial direction of the user (e.g., a direction that the face of a user is pointed or directed). In some implementations, the facial direction of the user is expressed as one or more angles of the face of the user relative to a display. For example, one or more images of a user (e.g., as embodied in video data of the user) are provided as input to one or more models (e.g., machine learning models, algorithmic models, and the like) that provide, as output, a facial direction of the user. In some implementations, a facial direction of the user will indicate disengagement when one or more angles of the facial direction exceed a threshold. For example, a user facing directly at the display will have a facial direction substantially perpendicular to the display, while a user facing away from the display will have a greater angle of facial direction. One skilled in the art will appreciate that a facial direction of the user is separate from the line of sight of the user, as the line of sight of the user does not necessarily match the facial direction of the user. One skilled in the art will appreciate that, in some implementations, the facial direction of the user is used instead of or in conjunction with the line of sight of the user as possible visual characteristics indicating disengagement with video conference.

Consider an example where a participant in the video conference frequently looks at their phone, causing them to face away from the display presenting the video conference, and instead turning to face their phone. This facial direction contributes to a determination that the user is disengaged with the video conference.

In some implementations, the one or more visual characteristics of the user include a posture of the user. The posture of the user includes a position of the user within the video data capturing the user. In some implementations, the posture of the user includes a vertical positioning of the user in the video data (e.g., a height of the user in the frame of video data). For example, in some implementations, a vertical position of the user falling below a threshold indicates disengagement with the video conference. As another example, in some implementations, change or delta of a vertical position of the user exceeding a threshold indicates disengagement with the video conference. In other words, an initial vertical position of a user is compared to a current vertical position of the user, and the difference in vertical position indicates disengagement with the video content where the difference exceeds a threshold.

In some implementations, the posture of the user includes an angle of posture of the user in the video data (e.g., relative to the Y-axis). For example, a user sitting upright will have a lesser angle of posture, while a user leaning to one side will have a greater angle of posture. For example, in some implementations, an angle of posture of the user exceeding a threshold indicates disengagement with the video conference. As another example, in some implementations, change or delta of an angle of posture of the user exceeding a threshold indicates disengagement with the video conference.

The method of FIG. 4 also includes displaying 406 (e.g., by the engagement module 108a) a visual overlay in response to the one or more criteria being satisfied. The visual overlay serves to remedy disengagement with the video conference. In some implementations, the visual overlay is displayed at a predefined location relative to the video conference, or at a predefined location in the display. For example, the visual overlay is displayed in an upper portion of the display so as to be visible to the user without obstructing view of the video conference. In some implementations, the visual overlay includes a user interface element (e.g., transparent or opaque). In some implementations, the visual overlay includes a notification or other message presented to the user. In some implementations, a sound or other audio notification is played concurrent to displaying the visual overlay. In some implementations, the visual overlay is displayed in response to determining that the user is disengaged with the video conference for a predefined amount of time, thereby preventing display of the visual overlay during momentary or brief lapses in engagement.

By presenting the visual overlay, a user is notified that they appear disengaged with the video conference. This allows the user to take corrective action to appear more engaged with the content (e.g., adjusting posture, redirecting their line of sight to the video conference, and the like).

In some implementations, determining that the one or more criteria are satisfied or displaying the visual overlay is based on one or more user preferences. In some implementations, the one or more user preferences are defined by the user (e.g., the user whose engagement is being determined). In other implementations, the one or more user preferences are defined by another user, such as a host or administrator associated with the video conference.

In some implementations, the user preferences determine whether the visual overlay is displayed at all. For example, a user does not wish to be notified when they appear disengaged and preferentially selects that the visual overlay not be displayed. As another example, a user selects that they wish to be notified when they appear disengaged. As a further example, a host of a video conference selects that all users participating in the video conference will have a visual overlay displayed if determined that they are disengaged with the video conference.

In some implementations, the user preferences define a duration that the visual overlay is displayed (e.g., for a predefined amount of time), until it is determined that the disengagement has been remedied. In some implementations, the user preferences define a time window or time threshold after ending display of a visual overlay until another visual overlay is able to be displayed. In some implementations, the user preferences define particular visual characteristics to be used in determining whether a user is disengaged with the video conference. Accordingly, in some implementations, particular classifier models or engagement score functions to be used are based on the user preferences.

Figure 5:
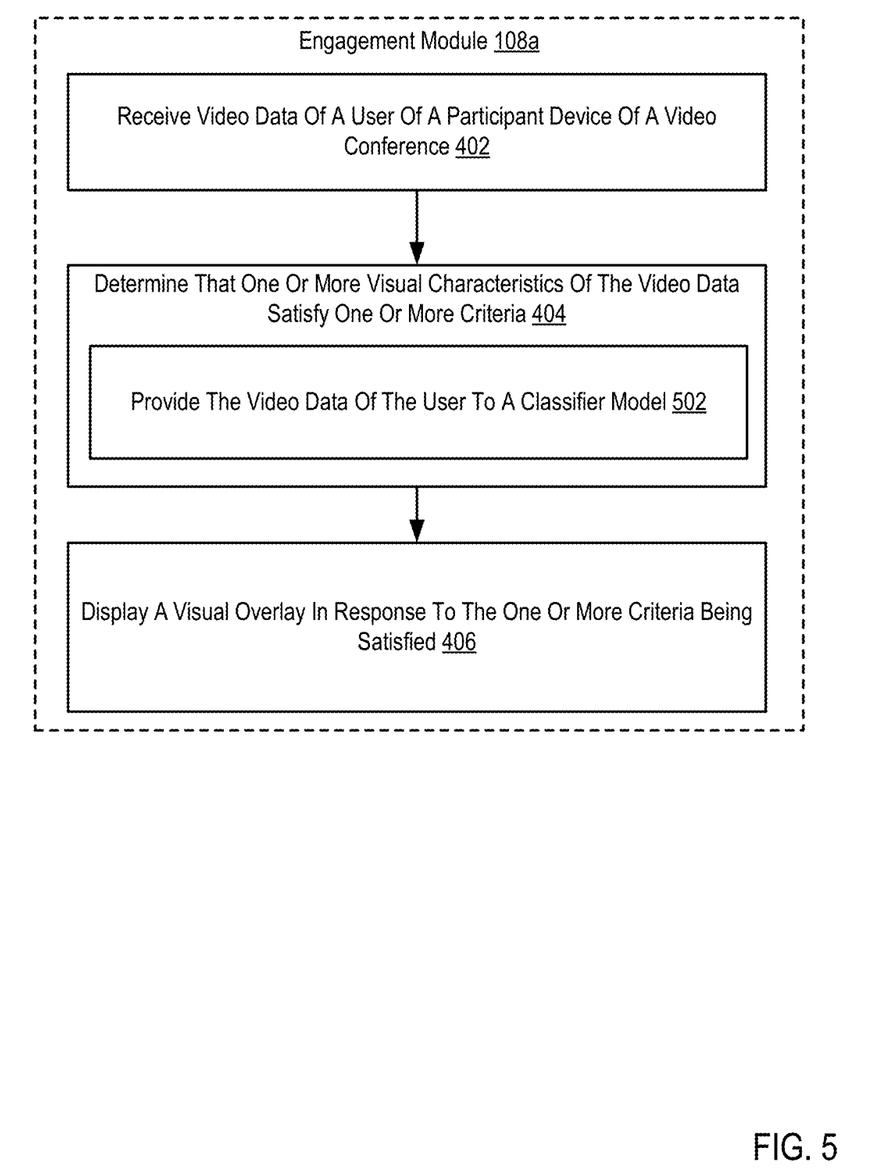
FIG. 5 is a flowchart illustrating a variation of the method the method of FIG. 4.

For further explanation, FIG. 5 sets forth a flow chart illustrating a variation of the example method of FIG. 4. In FIG. 5, determining 404 that one or more visual characteristics of the video data satisfy one or more criteria includes providing 502 the video data of the user to a classifier model. The classifier model is trained to determine, based on input image or video data, whether a user depicted in the input data is disengaged. For example, training data depicting engaged and disengaged users are used to train the classifier model. The video data of the user is then provided as input to the classifier model, and an output is generated indicating whether or not the user is disengaged. In other words, the one or more criteria are satisfied in response to an output of the classifier model indicating that the user is disengaged with the video conference.

In some implementations, the classifier model is one of a plurality of classifier models each trained to determine whether a user is disengaged with the video conference based on different visual characteristics. For example, a first classifier model is trained to determine whether a user is disengaged with the video conference based on the gaze of the user, a second classifier model is trained to determine whether a user is disengaged with the video conference based on a facial direction of the user, a third classifier model is trained to determine whether a user is disengaged with the video conference based on both line of site and posture, and the like. Accordingly, in some implementations, the engagement module 108a is configurable to determine whether a user is engaged based on a configurable set of visual characteristics.

Figure 6:
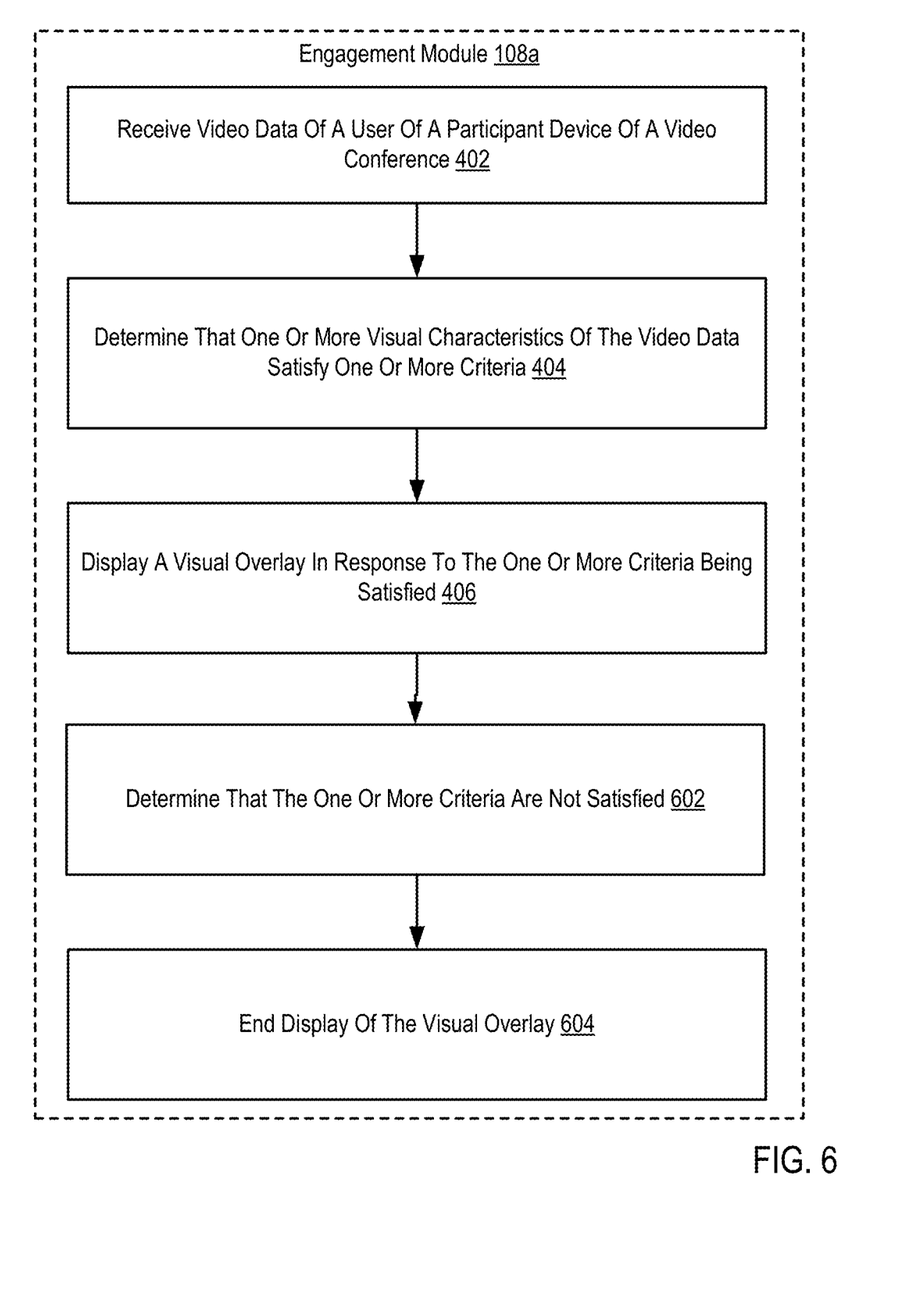
FIG. 6 is a flowchart illustrating an extended variation of the method of FIG. 4.

For further explanation, FIG. 6 sets forth a flow chart illustrating an extended variation of the example method of FIG. 4. The method of FIG. 6 includes determining 602 that the one or more criteria are not satisfied. In some implementations, after displaying the visual overlay, the engagement module 108a continually or periodically redetermines whether the criteria are no longer satisfied (e.g., determining that the user is no longer disengaged with the video conference). For example, the engagement module 108a recalculates engagement scores or provides video data of the user to a classifier model to determine whether the criteria indicating disengagement with the video conference are no longer satisfied.

The method of FIG. 6 also includes ending 604 display of the visual overlay. In other words, in response to the disengagement with the video conference being remedied (e.g., by virtue of an engagement score meeting a threshold or by the classifier determining that the user is engaged), the engagement module 108a then ends display of the visual overlay.

In view of the explanations set forth above, readers will recognize many benefits of correcting engagement of a user in a video conference. One such benefit, for example, includes improved attention during a video conference by correcting user disengagement through when a user's visual characteristics indicate disengagement.

Exemplary implementations of the present disclosure are described largely in the context of a fully functional computer system for correcting engagement of a user in a video conference. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A computer implemented method of correcting engagement of a user in a video conference, the method comprising:
   receiving video data of a user of a participant device of a video conference;
   determining that one or more visual characteristics of the video data satisfy one or more criteria, the determining including providing video data of the user to a plurality of classifier models, each classifier model trained to determine user engagement with the video conference based on a different one of the one or more visual characteristics; and
   providing, to the participant device, an indicator to display a visual overlay in response to the one or more criteria being satisfied.

2. The method of claim 1, wherein the one or more visual characteristics comprise one or more of: a posture of the user, a gaze of the user, or a facial direction of the user.

3. The method of claim 1, further comprising:
   determining that the one or more criteria are no longer satisfied; and
   ending display of the visual overlay.

4. The method of claim 1, wherein at least one of determining that the one or more criteria are satisfied or displaying the visual overlay is based on one or more user preferences.

5. The method of claim 4, wherein the one or more user preferences are associated with the user.

6. The method of claim 4, wherein the one or more user preferences are associated with a host of the video conference.

7. The method of claim 1, wherein the classifier models to be used to determine user engagement are based on one or more user preferences.

8. An apparatus for correcting engagement of a user in a video conference, the apparatus comprising:
 a computer processor; and
 a computer memory, the computer memory including computer program instructions that, when executed by the computer processor, cause the computer processor to carry out:
 receiving video data of a user of a participant device of a video conference;
 determining that one or more visual characteristics of the video data satisfy one or more criteria, the determining including providing video data of the user to a plurality of classifier models, each classifier model trained to determine user engagement with the video conference based on a different one of the one or more visual characteristics; and
 displaying a visual overlay in response to the one or more criteria being satisfied.

9. The apparatus of claim 8, wherein the one or more visual characteristics comprise one or more of: a posture of the user, a gaze of the user, or a facial direction of the user.

10. The apparatus of claim 8, further comprising computer program instructions that, when executed by the computer processor, cause the computer processor to carry out:
 determining that the one or more criteria are no longer satisfied; and
 ending display of the visual overlay.

11. The apparatus of claim 8, wherein at least one of determining that the one or more criteria are satisfied or displaying the visual overlay is based on one or more user preferences.

12. The apparatus of claim 11, wherein the one or more user preferences are associated with the user.

13. The apparatus of claim 11, wherein the one or more user preferences are associated with a host of the video conference.

14. The apparatus of claim 8, wherein the classifier models to be used to determine user engagement are based on one or more user preferences.

15. A computer program product disposed upon a non-transitory computer readable medium, the computer program product comprising computer program instructions for correcting engagement of a user in a video conference that, when executed, cause a computer system to perform steps comprising:
 receiving video data of a user of a participant device of a video conference; determining that one or more visual characteristics of the video data satisfy one or more criteria, the determining including providing video data of the user to a plurality of classifier models, each classifier model trained to determine user engagement with the video conference based on a different one of the one or more visual characteristics; and
 displaying a visual overlay in response to the one or more criteria being satisfied.

16. The computer program product of claim 15, wherein the one or more visual characteristics comprise one or more of: a posture of the user, a gaze of the user, or a facial direction of the user.

17. The computer program product of claim 15, wherein the steps further comprise:
 determining that disengagement with the video conference has been remedied; and
 ending display of the visual overlay.

18. The computer program product of claim 15, wherein at least one of determining that the one or more criteria are satisfied or displaying the visual overlay is based on one or more user preferences.

19. The computer program product of claim 18, wherein the one or more user preferences are associated with the user.

20. The computer program product of claim 15, wherein the classifier models to be used to determine user engagement are based on one or more user preferences.

* * * * *